(12) United States Patent
Hamm et al.

(10) Patent No.: US 10,221,960 B2
(45) Date of Patent: Mar. 5, 2019

(54) VALVE ASSEMBLY

(71) Applicant: BUERKERT WERKE GMBH & CO. KG, Ingelfingen (DE)

(72) Inventors: Thomas Hamm, Ingelfingen (DE); Thomas Diem, Neuenstein (DE); Ina Schmetzer, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 0 days.

(21) Appl. No.: 15/620,083

(22) Filed: Jun. 12, 2017

(65) Prior Publication Data

US 2017/0356568 A1  Dec. 14, 2017

(30) Foreign Application Priority Data

Jun. 14, 2016  (DE) .................. 10 2016 110 904

(51) Int. Cl.
*F16K 37/00* (2006.01)
*F15B 13/08* (2006.01)
*F16K 27/00* (2006.01)
*F15B 15/20* (2006.01)

(52) U.S. Cl.
CPC ...... *F16K 37/0025* (2013.01); *F15B 13/0814* (2013.01); *F15B 13/0817* (2013.01); *F15B 13/0864* (2013.01); *F15B 15/20* (2013.01); *F16K 27/003* (2013.01); *F16K 37/0041* (2013.01); *F15B 2211/3057* (2013.01); *F15B 2215/30* (2013.01); *Y10T 137/4857* (2015.04); *Y10T 137/6011* (2015.04); *Y10T 137/7613* (2015.04); *Y10T 137/8242* (2015.04); *Y10T 137/87885* (2015.04)

(58) Field of Classification Search
CPC ......... Y10T 137/6011; Y10T 137/7613; Y10T 137/4857; Y10T 137/8242; Y10T 137/87885; F16K 27/003; F16K 37/0041; F15B 13/0835; F15B 13/0814; F15B 13/0817; F15B 13/0864
See application file for complete search history.

(56) References Cited

U.S. PATENT DOCUMENTS

| | | | | |
|---|---|---|---|---|
| 4,378,027 A | * | 3/1983 | Weirich | ............ E21D 23/26 137/551 |
| 4,842,021 A | * | 6/1989 | Stoll | ............ F15B 13/081 137/271 |
| 7,025,090 B2 | | 4/2006 | Bramley et al. | |

(Continued)

FOREIGN PATENT DOCUMENTS

| DE | 20119954 U1 | 3/2002 |
|---|---|---|
| DE | 20119954 U1 | 4/2002 |
| DE | 60127985 T2 | 8/2007 |

(Continued)

*Primary Examiner* — Atif H Chaudry
(74) *Attorney, Agent, or Firm* — McNees Wallace & Nurick LLC

(57) ABSTRACT

A valve assembly with at least two valve modules is described, wherein the valve modules are arranged one beside the other in a line-up direction. The valve assembly also comprises an indicating device for displaying a state of the valve modules and/or of the valve assembly and/or of a component connected to the valve assembly. In the line-up direction the indicating device continuously extends over all valve modules.

13 Claims, 4 Drawing Sheets

(56) References Cited

U.S. PATENT DOCUMENTS

| | | | | |
|---|---|---|---|---|
| 7,490,625 B1* | 2/2009 | Johnson | ............. | G01M 3/3236 |
| | | | | 137/596.16 |
| 2014/0183387 A1* | 7/2014 | Andersen | ................ | F16K 31/04 |
| | | | | 251/129.03 |

FOREIGN PATENT DOCUMENTS

| DE | 202013011331 U1 | 2/2014 | | |
|---|---|---|---|---|
| DE | 202013011331 U1 | 3/2014 | | |
| DE | 202014004294 U1 | 10/2015 | | |
| EP | 1272767 A1 | 1/2003 | | |
| EP | 1272767 B1 | 11/2003 | | |
| WO | 0177534 A1 | 10/2001 | | |
| WO | 2010057507 A1 | 5/2010 | | |
| WO | WO 2010057507 A1 * | 5/2010 | ................ | F04F 5/44 |

* cited by examiner

VALVE ASSEMBLY

FIELD OF THE INVENTION

This invention relates to a valve assembly with at least two valve modules which in a line-up direction are arranged one beside the other, and with an indicating device for displaying a state of the valve modules and/or the valve assembly and/or a component connected to the valve assembly.

BACKGROUND

Such a valve assembly is known from DE 20 2013 011 331 U1. To its valve modules a pneumatic cylinder can be connected, for example. On each valve module an indication display is provided, by means of which a functional state of the valve module or of an actuator connected thereto, for example of the pneumatic cylinder, can be indicated. The indication display for example is designed as colored signal lamp, wherein the color of the emitted light is changed in the case of a change of the monitored functional state. The indication displays each are arranged on an outer surface of the associated valve module.

Another valve assembly of the type mentioned above is known from DE 201 19 954 U1. There is described a valve assembly with several valve modules and an additional operating part. For the comfortable manual actuation of the valves the operating part can be removed from a valve island. The operating part then communicates with the main part of the valve assembly via a wireless signal. On the operating part a visual display means is arranged, by means of which operating states of the valve units can be displayed. For example, the switching states of individual valve units can be indicated by means of a display.

An additional valve assembly of the type mentioned above is known from EP 1 272 767 B1. The valve assembly comprises several plate valves and a plate-like housing part on which the plate valves are arranged. On the plate-like housing part a display and several keys are arranged, which serve for adjusting and programming the valve assembly. The plate-shaped housing part can be configured as microcomputer.

The known valve assemblies can be divided into two groups. On the one hand, there are valve assemblies in which an indicating device is arranged on each individual valve module. By means of this indicating device information can be indicated specifically for the individual valve modules. This group for example includes the valve assembly of DE 20 2013 011 331 U1. To provide for the desired function, the indicating devices must be of very compact design, so that they can be mounted on a surface of a valve module. On the other hand, there are valve assemblies in which on a component separate from the valve modules a display or a comparable indicating device is arranged. This group for example includes the valve assembly of DE 201 19 954 U1 and EP 1 272 767 B1. Such displays can be designed distinctly larger as compared to the first-mentioned group and thus display more content and more complex content. With valve assemblies of this type it is not possible, however, to allocate status information of an individual valve module directly to this valve module in a simple form.

It is the object of the present invention to create a valve assembly of simple construction and easy to handle for the user.

SUMMARY

The present invention provides a valve assembly of the type mentioned above, in which the indicating device is a display for outputting text and/or symbols, which in the line-up direction extends continuously over all valve modules, in particular extends substantially across the entire width of the valve modules. Entire width of the valve modules is understood to be the spatial extension of the valve modules along the line-up direction. For example, the indicating device can be a display or a screen. The indicating device hence in essence is as wide as the valve modules together. It thus is large enough to also indicate complex information. This for example is text and/or symbols. The display can be of the multi-colored or multi-line type. It also is possible to indicate information concerning individual valve modules. The term "display" (also known as "screen" or "monitor") is understood to be an electrically actuated display without any movable parts for visually signaling variable information. The display is characterized in that it can output a plurality of different indications, such as characters, letters and/or symbols, in contrast for example to light displays, which light up e.g. red, yellow or green and only symbolize one operating state, or matrix displays with e.g. five light emitting diodes arranged one above the other.

The valve assembly according to the invention provides for a flexible indication of states which are associated to individual valve modules. It also is possible to indicate different, complex and/or extensive information. From the indication of the valve assembly it is intuitively comprehensible to which valve module the information is associated. At the same time the indication is easy to read. The indicating device can be an LCD display, an OLED display, a vacuum fluorescent display or an e-paper display. Other suitable displays also are possible. Such indicating devices are available on the market at low cost as reliable standard components.

Preferably, the indicating device extends over two to ten valve modules. More preferably, the indicating device extends over four, six or eight valve modules.

The common display forms the only indicating device of the individual valve modules, i.e. the same otherwise do not have their own indicating devices, neither for outputting symbols or letters/text nor ready indicators such as LED lights. All indications are output via the common display. Preferably, the indicating device comprises display fields whose number corresponds to the number of the associated valve modules and which each are geometrically allocated to one of the valve modules. The display fields are portions of the indicating device. The allocation to the valve modules is effected geometrically, i.e. a display field is arranged adjacent to the associated valve module. Such display field then for example is arranged beside, above or below an associated valve module. By an operating person, such display field hence is intuitively associated with the adjacent valve module. Status information concerning the individual valve modules thus can be displayed in a simple way. The possibility to display large, extensive and complex contents is not limited thereby.

According to one embodiment, it is possible to display text and/or at least one symbol in each of the display fields, wherein the text and/or the symbol corresponds or correspond to a state of the valve module associated to the display field. For example, it can be displayed whether the valve module is energized, in what position a piston of an actuator (e.g. a process valve) connected to the valve module and actuated by the valve module is disposed and/or what states the solenoid valves are in, which are arranged in the valve module. In the same way, states of actuators connected to the valve module can be displayed. In addition, warnings and cautions, for example concerning an upcoming maintenance, can be displayed. Thus, it is easily possible to display status information concerning the individual valve modules.

For detecting the states of a valve module and for indicating the same, the display module can be coupled with sensors of the connected actuators actuated by the valve module. The sensor inputs of the valve modules receive sensor signals/feedback of the connected actuators. It would also be possible, however, that sensors detect a state of the solenoid valve of the valve module itself.

One design variant in addition provides that text and/or at least one symbol can be displayed in the indicating device substantially over its entire extension in the line-up direction, wherein the text and/or the symbol corresponds or correspond to a state of one of the valve modules. Hence, the text and/or the at least one symbol now utilizes or utilize the entire width of the indicating device, i.e. the entire width of all valve modules. As a result, a large display area is available, on which complex information can be displayed in an intuitively comprehensible way. A representation of multi-line text likewise is possible. In this way, for example, warnings and/or error messages can be displayed as text.

For the case that the text to be displayed and/or the at least one symbol to be displayed is/are too large for the display, a ticker can be used.

Advantageously, the text and/or the symbol can be displayed in each of the display fields in a way temporally alternating with the text and/or the symbol over the entire extension of the indicating device in line-up direction. Thus, it is possible to display both specific information for individual valve modules and large-surface information with a single indicating device. The respective display duration or the alternating frequency of the indication, can be set individually. Thus, the indicating device requires only little installation space without its scope of functions being limited.

In one design alternative the indicating device is arranged in a display module of the valve assembly, and the extension of the display module in line-up direction substantially corresponds to the extension of the indicating device. The display module for example can be put onto a group of valve modules as lid member. Thus, standard valve modules can be used, for example those without their own indicating device. The lid member additionally can accommodate electronic components which for example serve the control and/or monitoring of the individual valve modules. This provides for a simple and inexpensive construction.

Preferably, connections for sensors are arranged on the display module. The connections for sensors thus are geometrically allocated to the valve modules analogous to the display fields. The connections for sensors hence are each arranged beside, above or below the associated valve module. Thus, an operating person intuitively can visually recognize the allocation. This is advantageous in particular in valve assemblies with many valve modules.

The connections for sensors each can be arranged in a region of the display module which in line-up direction corresponds to the extension of the valve module associated to the respective connection. Thus, the connections for sensors are geometrically associated to a valve module. This allocation can easily be optically recognized, which during the assembly and/or cabling of a valve prevents errors and thus accelerates the assembly and troubleshooting. In this embodiment, both the states of the solenoid valves of a valve module and the states of the actuators connected to the valve modules and controlled by the same are displayed on the same display module, and the sensor inputs which report back these states of the actuators are arranged on the same display module.

According to one embodiment, the valve modules are mounted on a carrier module.

In one design variant additional modules, in particular electronic modules, are arranged beside the valve modules in line-up direction. The indicating device substantially extends across the entire width of the valve modules and of the additional modules in line-up direction. The indicating device hence is as wide as the valve modules and the remaining modules together. This provides a large display area, and information associated to the individual modules nevertheless can be displayed.

In addition, the indicating device can be coupled with a control unit arranged in the valve assembly and act as output unit of the control unit. The indicating device hence also displays information obtained in the control unit and/or a superordinate unit. For example, an indication alternating with the aforementioned information is possible. Thus, numerous display functions are realized in a very limited installation space.

Preferably, the indicating device is coupled with a bus line and acts as output unit associated to the bus line. Information on the bus line, which then generates an indication, thus can be supplied to the indicating device.

According to one design alternative the valve assembly comprises a plurality of indicating devices. The indicating devices each can extend substantially across the width of a group of adjacent valve modules in line-up direction, wherein at least one indicating device is associated to each valve module. For example, one indicating device thus is associated to groups of four valve modules each. One indicating device hence extends across the width of four valve modules. It also is possible that several indicating devices are associated to one or more valve modules. The allocation again can be recognized intuitively due to the geometrical neighborhood.

DETAILED DESCRIPTION

Figure 1:
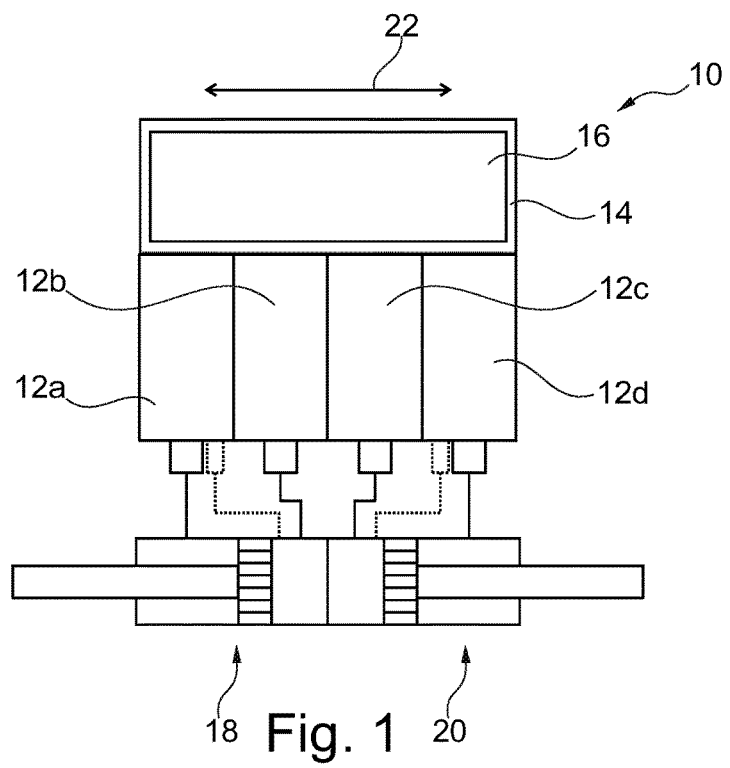
FIG. 1 shows a first embodiment of a valve assembly according to the invention.

FIG. 1 shows a first embodiment of a valve assembly 10 which comprises four valve modules 12a to 12d.

In the valve assembly 10 there is also arranged a display module 14 in which an indicating device 16 in the form of a display is provided.

To the valve modules 12a and 12b a first component 18 in the form of an actuator, here a first pneumatic cylinder or first pneumatic valve, and to the valve modules 12c and 12d a second component 20 in the form of a second actuator, here a pneumatic cylinder or second pneumatic valve, is connected, so that each valve module has an integrated solenoid valve.

Frequently, however, a valve module has two solenoid valves and hence two outputs to which a pneumatic cylinder, e.g. on opposite sides of a piston or actuating member, or a pneumatic valve is connected, i.e. one solenoid valve for aeration and one solenoid valve for deaeration. The pneumatic valve then is closed by means of a spring and opened with air.

In FIG. 1 this variant is indicated with broken lines for the valve modules 12a and 12d. In this case, the valve modules 12b and 12c can be omitted.

The indicating device 16 substantially extends in a line-up direction 22 of the valve modules 12a to 12d, which are represented by an arrow, continuously over all valve modules 12a to 12d.

Figure 2:
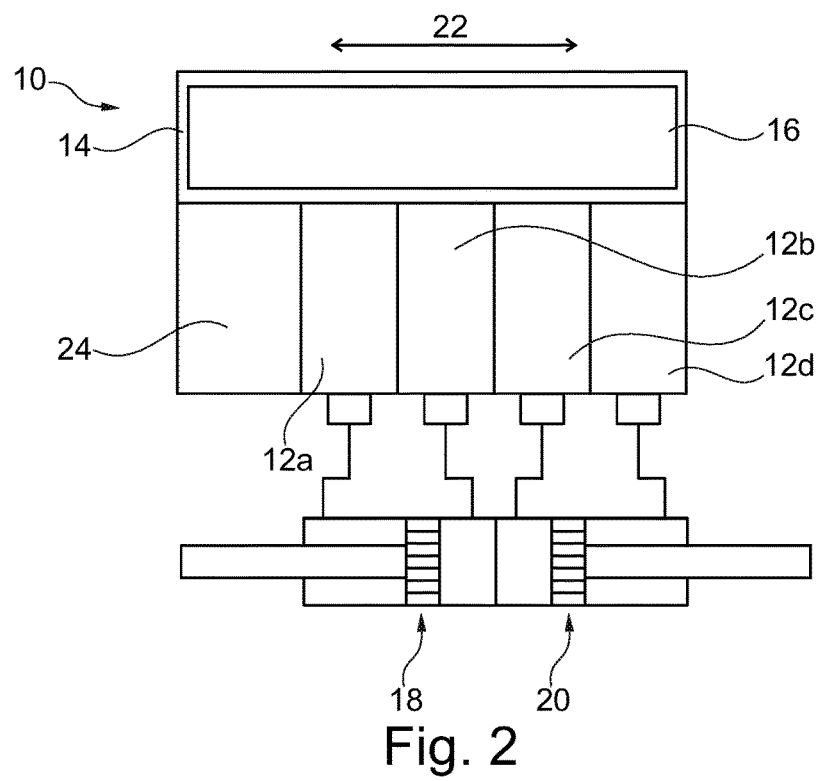
FIG. 2 shows a second embodiment of a valve assembly according to the invention.

FIG. 2 shows a second embodiment of the valve assembly 10. In the following, merely the differences to the first embodiment from FIG. 1 will be discussed.

In the embodiment of FIG. 2 an additional module 24, which here is configured as control unit, is provided in addition to the valve modules 12a to 12d and to the display module 14. In this embodiment the display device 16 extends in the line-up direction 22 both over the valve modules 12a to 12d and over the additional module 24. In this embodiment with additional module 24 it is, however, also possible that the display module 14 extends exclusively over the valve modules 12a to 12d.

The indicating device 16 can be coupled with the control unit via a bus line and act as its output unit.

Figure 3:
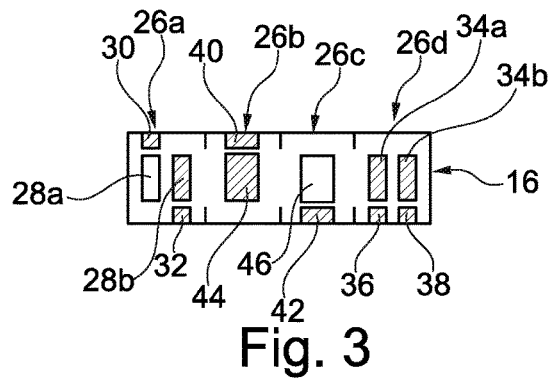
FIG. 3 shows an indicating device of a valve assembly according to the invention in a first state.

FIG. 3 shows the indicating device 16 in a detail representation. This can be the indicating device 16 similar to the one of the first embodiment of the valve assembly 10 (see FIG. 1).

The indicating device 16 is formed for a valve assembly 10 with four valve modules 12a to 12d and therefore comprises four display fields 26a to 26d, which each are associated to one of these valve modules 12a to 12.

In the display field 26a an indication consisting of symbols is displayed, which for example is linked with a valve module in which two electromagnetic pilot control valves are arranged. A bar 28a displayed in white and a bar 28b displayed in black indicate that the pilot control valve associated to the bar 28a is not energized, whereas the pilot control valve associated to the bar 28b is energized. In this embodiment the valve module 12a and the valve module 12d each have two outputs and two solenoid valves, as is indicated in FIG. 1 with broken lines, whereas the valve modules 12b and 12c each have only one solenoid valve and one output.

A bar 30 displayed in black reveals that a piston of a connected actuator actuated by the valve module is in an upper end position. A bar 32 displayed in black reveals that a piston of a connected actuator actuated by the valve module is in a lower end position.

The same applies for the pilot control valve associated to the display field 26d. Bars 34a and 34b indicate that both pilot control valves are energized. In addition, the bars 36 and 38 reveal that both actuators actuated by the valve module are in a lower end position.

The display fields 26b and 26c for example are linked with a pneumatic cylinder connected to an associated valve module (cf. FIG. 1).

Bars 40 and 42 can be associated to an end position of the pneumatic cylinder. The pneumatic cylinder associated to the display field 26b hence is in an upper end position and the pneumatic cylinder associated to the display field 26c is in a lower end position.

The bars 44 and 46 can correspond to an operating state. The bar 44 shows that the solenoid valve, i.e. the pilot control valve, is energized, and the bar 46 shows that the solenoid valve is not energized. The valve modules associated to the display fields 26b and 26c include only one solenoid valve, while the valve modules associated to the display fields 26a and 26b include two solenoid valves.

Figure 4:
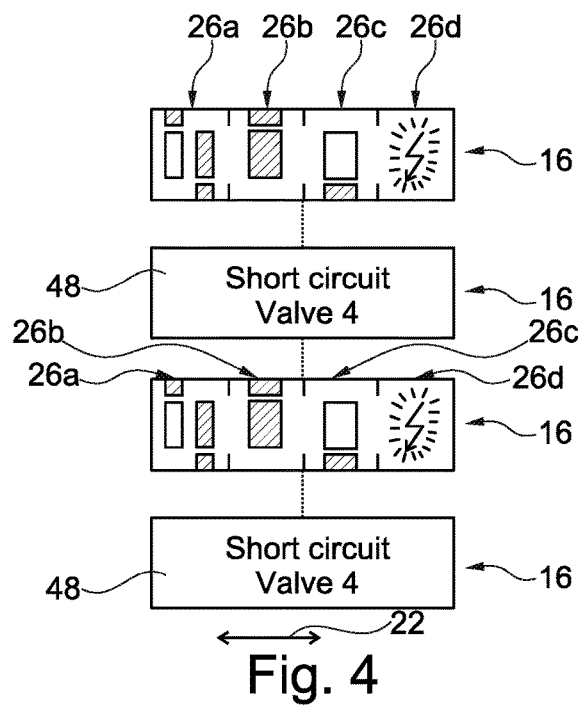
FIG. 4 shows an indicating device of a valve assembly according to the invention in a second state.

FIG. 4 shows a further state of the indicating device 16, which for example can be part of the first embodiment of the valve assembly 10 (see FIG. 1). In the following, merely the differences to the state of the indicating device 16 shown in FIG. 3 will be discussed.

In FIG. 4, a lightning symbol is shown in the display field 26d. The same indicates a short circuit. The remaining display fields 26a to 26c do not differ from FIG. 3.

In the state of FIG. 4 an alternating display of information takes place. This means that in temporal alternation the display fields 26a to 26d and an indication 48 reaching across the entire width of the indicating device are shown.

The indication 48 is made up of two lines and indicates that a short circuit exists at the "valve 4".

In FIG. 4, segments of the indications appearing one after the other are arranged one below the other and are connected with a dotted line that symbolizes the temporal sequence.

Thus, both the display fields 26a to 26d concerning the individual valve modules and an indication 48 reaching across the entire width of the indicating device 16 can be displayed.

Figures 5, 6:
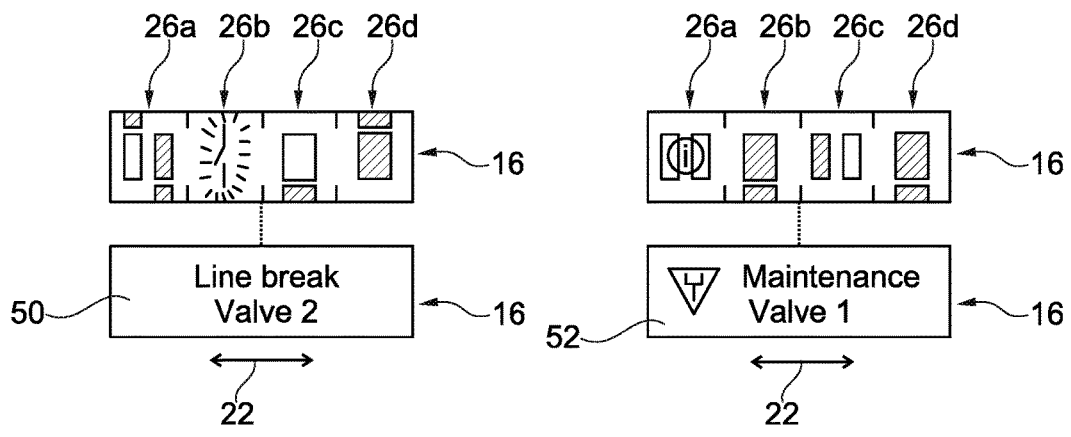
FIG. 5 shows an indicating device of a valve assembly according to the invention in a third state.
FIG. 6 shows an indicating device of a valve assembly according to the invention in a fourth state.

FIG. 5 shows a further state of the indicating device 16, which for example can be part of the first embodiment of the valve assembly 10 (see FIG. 1).

Here, a circuit symbol is shown in the display field 26b, which indicates a line break. Due to the arrangement of this symbol in the display field 26b, an allocation of this symbol to the second valve module is intuitively visible.

The display fields 26a to 26d again are shown in alternation with a text display 50 which indicates the line break in "valve 2". The alternating display again is represented by a dotted line.

Another state of the indicating device 16 is shown in FIG. 6. Again, the indicating device 16 can be part of the first embodiment of the valve assembly 10 (see FIG. 1).

Here, a symbol indicating an upcoming maintenance is shown in the display field 26a. The display field 26a is associated to a "valve 1".

Again, in alternation with the display fields 26a to 26d an indication 52 reaching over the entire extension of the indicating device 16 is shown. This indicates the upcoming maintenance at the "valve 1".

Figure 7:
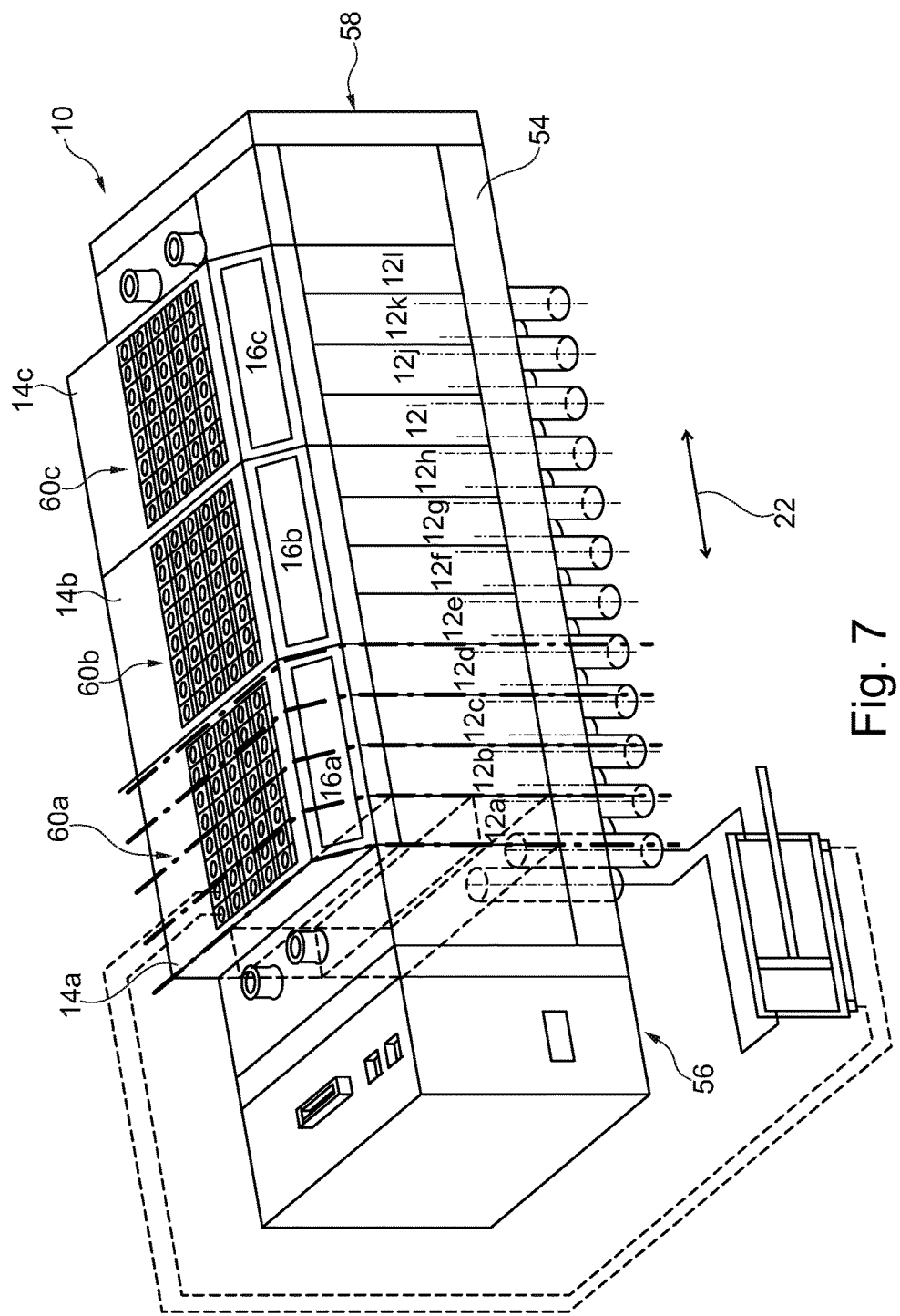
FIG. 7 shows a third embodiment of a valve assembly according to the invention.

FIG. 7 shows an alternative embodiment of the valve assembly 10.

The same comprises a carrier module 54 on which valve modules 12a to 12l are arranged. To the valve modules 12 to 12l a display module 14a to 14c each is associated in groups of four.

In the display modules 14a to 14c an indicating device 16a to 16c each is provided, which in a line-up direction 22 of the valve modules 12a to 12l extends over all associated valve modules.

The display modules 14a to 14c are configured as covering modules.

Beside the indicating devices 16a to 16c the display modules 14a to 14c comprise connections 60a to 60c for sensors. As is symbolized by the dash-dotted lines at the display module 14a, the individual connections 60a for sensors are associated to the individual valve modules 12a to 12l in the same way as the display fields of the indicating device 16a. The same applies for the connections 60b and 60c for sensors. The display modules 14, 14a, 14b, 14c are formed and connected such that both the states of one or more integrated solenoid valves of a valve module 12a-12l and the states of the actuator (e.g. pneumatic cylinder) connected to the valve module 12a-12l and controlled by the same are indicated, wherein at the same display module 14, 14a, 14b, 14c the sensor inputs, i.e. connections 60a to 60c are arranged, which report back the states of the actuator.

In addition, a control unit 56 and an end cap 58 are associated to the valve assembly 10 as shown in FIG. 7. The end cap 58 closes the air channels.

One or more of the indicating devices 16a to 16d can be coupled with the control unit 56 and/or the control unit 58 via a bus line and act as its output unit.

Figure 8:
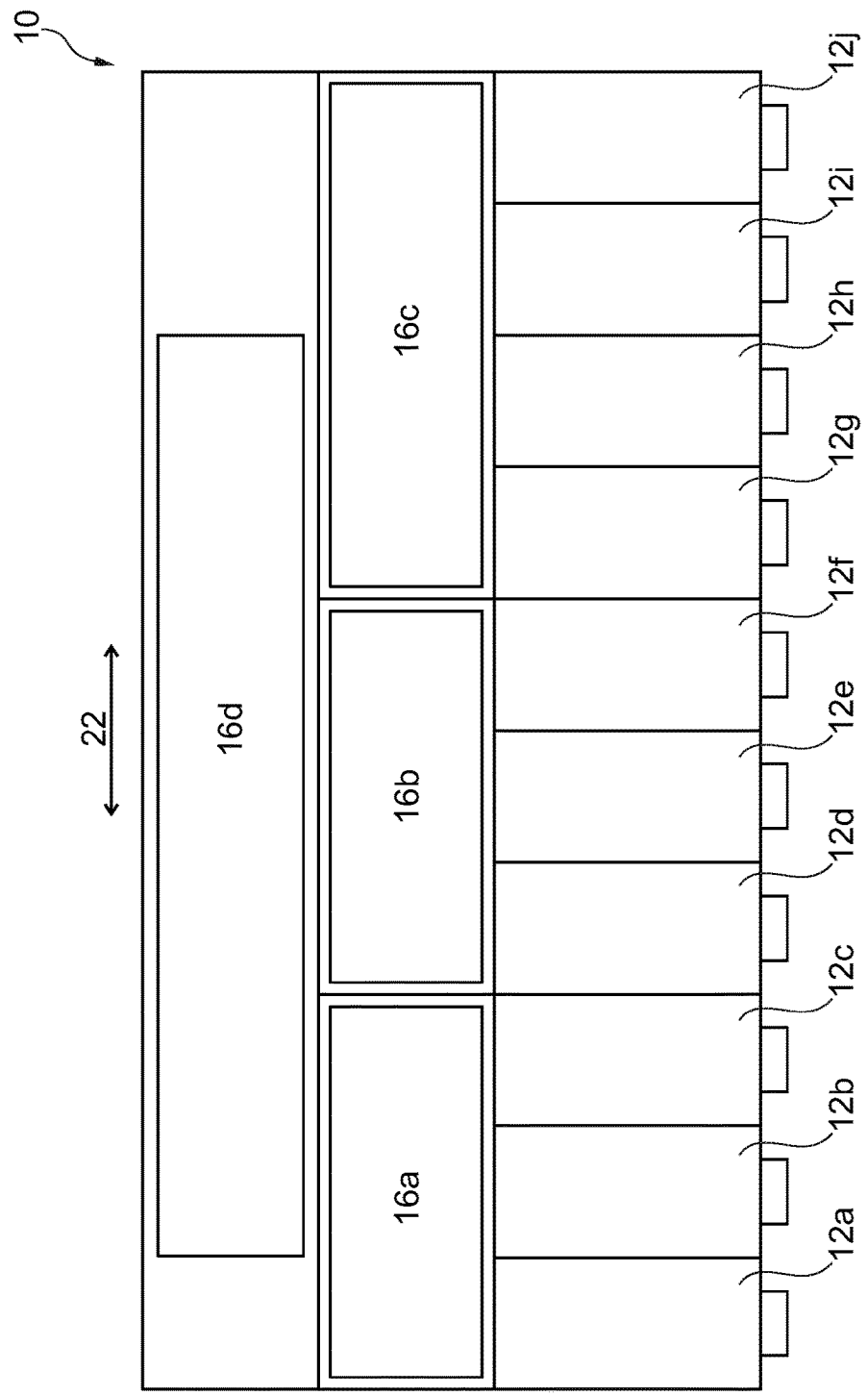
FIG. 8 shows a fourth embodiment of a valve assembly according to the invention.

FIG. 8 shows an additional embodiment of the valve assembly 10.

In this embodiment an indicating device 16a is associated to the valve modules 12a to 12c. An indicating device 16b is associated to the valve modules 12d to 12f and an indicating device 16c is associated to the valve modules 12g to 12j.

A further indicating device 16d is associated to the valve modules 12b to 12h.

Thus, one indicating device 16a or 16c each is associated to the valve modules 12a, 12i and 12j. Hence, a single display field, which is not shown in more detail, is associated to each of these valve modules 12a, 12i, 12j.

To the valve modules 12b to 12h two indicating devices 16a and 16d or 16b and 16d or 16c and 16d each are associated. To each of these valve modules 12b to 12h two display fields, which are not shown in more detail, hence are associated.

The common display forms the only indicating device of the individual valve modules 12a-12l, i.e. the same otherwise do not have their own indicating devices, neither for outputting symbols or letters/text nor ready indicators such as LED lights.

The invention claimed is:

1. A valve assembly with at least two valve modules which are arranged one beside the other in a line-up direction, and with an indicating device for displaying a state of at least one of the valve modules, the valve assembly and a component connected to the valve assembly, wherein the indicating device is a display for outputting text and/or symbols, which in the line-up direction extends continuously over all valve modules;
wherein the indicating device is arranged in a display module of the valve assembly and the extension of the display module in the line-up direction substantially corresponds to the extension of the indicating device;
wherein connections for sensors are arranged on the display module;
wherein the connections for sensors each are arranged in a region of the display module which in line-up direction corresponds to the extension of the valve module associated to the respective connection; and
wherein the display module is formed and connected such that both the states of one or more integrated solenoid valves of a valve module and the states of an actuator connected to the valve module and controlled by the same are indicated, wherein on the same display module the sensor inputs are arranged, which report back the states of the actuator.

2. The valve assembly according to claim 1, wherein the display extends across the entire width of the valve modules.

3. The valve assembly according to claim 1, wherein the indicating device comprises display fields whose number corresponds to the number of the associated valve modules and which each are geometrically allocated to one of the valve modules.

4. The valve assembly according to claim 3, wherein in each of the display fields text and/or at least one symbol can be displayed, wherein the text and/or the symbol corresponds or correspond to a state of the valve module associated to the display field.

5. The valve assembly according to claim 4, wherein the text and/or the symbol in each of the display fields can be displayed in temporal alternation with the text and/or the symbol over the entire extension of the indicating device in line-up direction.

6. The valve assembly according to claim 1, wherein text and/or at least one symbol can be displayed in the indicating device substantially over its entire extension in the line-up direction, wherein the text and/or the symbol corresponds or correspond to a state of one of the valve modules.

7. The valve assembly according to claim 1, wherein the valve modules are mounted on a common carrier module.

8. The valve assembly according to claim 1, wherein the display is the only indicating device of the individual valve modules and the same otherwise do not have their own indicating devices.

9. The valve assembly according to claim 1, wherein in the line-up direction additional modules are arranged beside the valve modules and in the line-up direction the indicating device substantially extends across the entire width of the valve modules and the additional modules.

10. The valve assembly according to claim 1, wherein the indicating device is coupled with a control unit arranged in the valve assembly and acts as output unit of the control unit.

11. The valve assembly according to claim 1, wherein the indicating device is coupled with a bus line and acts as output unit associated to the bus line.

12. The valve assembly according to claim 1, wherein the display is an LCD display, an OLED display, a vacuum fluorescent display or an e-paper display.

13. A valve assembly with at least two valve modules which are arranged one beside the other in a line-up direction, and with an indicating device for displaying a state of at least one of the valve modules, the valve assembly and a component connected to the valve assembly, wherein the indicating device is a display for outputting text and/or symbols, which in the line-up direction extends continuously over all valve modules;
wherein it comprises a plurality of indicating devices and in the line-up direction the indicating devices each extend substantially across the width of a group of adjacent valve modules, wherein to each valve module at least one indicating device is associated.

* * * * *